(12) United States Patent
Cade

(10) Patent No.: US 9,223,321 B2
(45) Date of Patent: Dec. 29, 2015

(54) REDUCTION OF PERIODIC DISTURBANCES

(71) Applicant: Control Techniques Limited, Newtown (GB)

(72) Inventor: Michael Cade, Newtown (GB)

(73) Assignee: CONTROL TECHNIQUES LIMITED, Newtown (GB)

( * ) Notice: Subject to any disclaimer, the term of this patent is extended or adjusted under 35 U.S.C. 154(b) by 113 days.

(21) Appl. No.: 14/080,298

(22) Filed: Nov. 14, 2013

(65) Prior Publication Data

US 2014/0139169 A1 May 22, 2014

(30) Foreign Application Priority Data

Nov. 15, 2012 (GB) .................................. 1220553.0

(51) Int. Cl.
| | |
|---|---|
| G05B 11/01 | (2006.01) |
| G05D 19/02 | (2006.01) |
| H02P 29/00 | (2006.01) |
| H02P 6/10 | (2006.01) |
| G05B 13/02 | (2006.01) |

(52) U.S. Cl.
CPC ........ G05D 19/02 (2013.01); H02P 6/10 (2013.01); H02P 29/0038 (2013.01); G05B 13/0225 (2013.01)

(58) Field of Classification Search
CPC .................................................... B62D 5/0463
USPC ............... 318/629, 400.14, 400.15, 432, 685, 318/632, 633, 560, 561; 324/623; 327/119; 331/76; 356/463; 359/328
See application file for complete search history.

(56) References Cited

U.S. PATENT DOCUMENTS

| | | | |
|---|---|---|---|
| 7,952,308 B2 | 5/2011 | Schulz et al. | |
| 8,378,598 B2 | 2/2013 | Kaneko | |
| 8,779,712 B2 * | 7/2014 | Tanabe et al. | 318/432 |
| 2006/0244407 A1 * | 11/2006 | Lawrence et al. | 318/685 |

FOREIGN PATENT DOCUMENTS

| | | |
|---|---|---|
| EP | 1182771 | 2/2002 |
| GB | 2374683 | 10/2002 |
| GB | 2465775 | 6/2010 |

* cited by examiner

*Primary Examiner* — Antony M Paul
(74) *Attorney, Agent, or Firm* — Harness, Dickey & Pierce, P.L.C.

(57) ABSTRACT

A method of reducing periodic disturbances in the feedback quantity of a controlled system is disclosed. The method includes receiving a feedback signal and repeatedly deriving respective magnitudes of harmonic components of the feedback signal to produce corresponding error signals. The error signals and harmonic components are used to generate harmonic control signals. The harmonic control signals are used to create a plurality of negative feedback loops acting to reduce the error signals. The present disclosure thus provides negative feedback control in the frequency domain. In one specific disclosed embodiment, the control is tied to the periodic domain resulting from the rotation of an actuator motor shaft.

20 Claims, 5 Drawing Sheets

REDUCTION OF PERIODIC DISTURBANCES

CROSS-REFERENCE TO RELATED APPLICATION

This application claims the benefit and priority of Great Britain Patent Application No. 1220553.0 filed Nov. 15, 2012. The entire disclosure of the above application is incorporated herein by reference.

FIELD

The present invention relates to a method and system for reducing periodic disturbances in a feedback quantity of a controlled system.

BACKGROUND

Systems and methods for the control of periodic disturbances are known. For example, U.S. Pat. No. 7,952,308 discloses a method and apparatus for reducing torque ripple in a permanent magnet motor system. A torque ripple reduction signal is produced in response to a torque command and operational control signals are modified in response to the torque ripple reduction signal to generate reduced ripple operational control signals, which are provided to an inverter for control of a permanent magnet motor. The torque ripple reduction signal includes one or more predetermined harmonics of a current signal of the motor defined in response to a predetermined torque ripple characteristic of the motor. EP 1,182,771 discloses a controller for an electronically commutated electrical machine that receives a feedback signal indicative of a parameter which it is desired to minimise, for example torque ripple, current, voltage, vibration or acoustic noise. The controller computes the amplitude and phase of a set of harmonics in the parameter and sequentially injects harmonics of the correct amplitude and phase to minimise the parameter. An optimising routine iterates through the set of harmonics to further reduce the parameter.

There is a need, in particular in the context of the control of a mechanical system in which the characteristics of a periodic perturbation changes over time, of an adaptive controller for reducing periodic perturbations, which can efficiently track a changing nature of a period perturbation.

SUMMARY

In one aspect, there is provided a system comprising a controlled system and a harmonic controller connected to the controlled system to provide a harmonic control signal to the controlled system for reducing periodic disturbances in a feedback quantity of the controlled system, as defined in claim 1. In another aspect, there is provided a method for reducing periodic disturbances in a feedback quantity of a controlled system, as defined in claim 13.

In one embodiment, a system is provided which comprises a controlled system and a harmonic controller connected to the controlled system to provide a harmonic control signal to the controlled system. The harmonic control signal acts to reduce periodic disturbances in a feedback quantity of the controlled system. The system has a plurality of control loops or signal paths, each of which comprises a magnitude calculator, an integrator, a harmonic generator and a multiplier. The magnitude calculator is coupled to the controlled system to receive a feedback signal representative of the feedback quantity and configured to repeatedly calculate a value of a magnitude of a respective harmonic component of the feedback signal. The integrator is coupled to the magnitude calculator to receive the repeatedly calculated values and is configured to sum the received values to produce an accumulated value. The harmonic generator is configured to generate a harmonic signal having the same frequency as the respective harmonic component and a phase relative to the respective harmonic component set to compensate for an estimated phase shift produced by the controlled system between the harmonic control signal and the feedback signal at the frequency of the respective harmonic component. The multiplier is coupled to the integrator and the harmonic generator to multiply the accumulated value and harmonic signal to produce a generated harmonic component. The harmonic controller is arranged to sum the generated harmonic components to produce the harmonic control signal and to apply the harmonic control signal to the controlled system to reduce the periodic disturbance in the feedback quantity.

In effect, the harmonic controller treats the values of magnitude of the respective harmonic components as an error signal which is integrated and provides a respective control for each harmonic component to drive down the magnitude by feedback control. The harmonic controller is thus inherently adaptive in that it will converge to a steady state in which the respective harmonic components of the feedback signal are compensated for by the generated harmonic components. If the controlled system or its operating conditions subsequently change, this introduces a new, non-zero magnitude for the respective harmonic components which changes the accumulated value and results in a change in the generated harmonic components until the respective harmonic components are again compensated for. By setting the phase of the generated components so as to compensate for the phase shift introduced by the controlled system at the respective frequency between the injection of the harmonic controlled signal to the controlled system and the feedback signal, the occurrence of positive feedback and the associated instability at one or more respective frequencies is avoided, facilitating system stability.

The harmonic controller may be configured to scale the generated harmonic component in each control loop to render the gain of the control loops independent of a frequency of the generated harmonic component. In this way, a single gain can be set to adjust the time constant of the control loops across the respective frequency of the different control loops and the single gain need not be changed as the frequency changes, for example when an angular velocity of the controlled system changes (see below).

The magnitude calculator may be configured to multiply the respective harmonic component (e.g. a sine or cosine function of the respective harmonic frequency) with the feedback signal and to integrate the result over one or more periods of the respective harmonic component. This provides an efficient way of calculating the magnitudes, in effect as continuously calculated Fourier coefficients.

The respective harmonic components of the harmonic controller may comprise two harmonic components in quadrature at a fundamental frequency and one or more pairs of further harmonic components in quadrature at integer multiples of the fundamental frequency. For example, the harmonic components may be pairs of a sine and cosine functions at each of the frequencies. By providing a set of functions in quadrature at each harmonic frequency, arbitrary phase relationships can be captured by the relative magnitude of the, e.g., sine and cosine components (noting that any sine or cosine function with an appropriate 90 degree phase shift between them achieve the same effect and can be used as appropriate). To provide a full representation up to a cut off harmonic, the integer multiplies may be contiguous.

The controlled system may comprise a motor for moving a movable part relative to a stationary part. It will be understood that the present disclosure is not limited to motors or indeed mechanical controlled systems, but is equally applicable to other controlled systems, such as a current source, where the control signal may be voltage and the feedback quantity current.

The harmonic components may be a function of position of the movable part relative to the stationary part. For example, the harmonic components may be a function of the intra-period position of the movable part relative to the stationary part. In the case of a rotating machine, this would be simply rotor angle, while in the case of a linear machine this would be the relative linear position within a pole or group of poles of the linear machine. In effect, then, the system then operates in a periodic domain, which is similar to operating in the frequency domain where the fundamental component corresponds to one revolution of the system (in case of a rotating machine). However, unlike in the frequency domain, the frequency of each component changes automatically with the speed of the motor. Equally, the harmonic components may be time based, so that the system operates in the frequency domain, in particular where the controlled system is not a motor and, thus, the periodic disturbances are not due to a characteristic of the motor or its load. As mentioned above, the movable part may be a rotor rotatable relative to the stationary part and the position may be an angular position of the rotor relative to the stationary part, as discussed above. The motor will generally be controlled by a motor controller and, in dependence on the input the motor controller requires, the harmonic control signal may be representative of motor torque, force, current or flux.

The controlled system may comprise a feedback controller, which is configured to produce a feedback error control signal in response to an error signal based on a comparison between a desired and an actual position or velocity of the movable part. The controlled system may then be configured to combine the feedback error control signal and the harmonic control signal to control the motor. Alternatively, the motor may be controlled by any other appropriate control algorithm, for example feed forward control, in which case the output of that algorithm would be combined with the harmonic control signal to control the motor. The feedback signal used by the harmonic controller may be the error signal of the feedback controller (or one of the error signals used by the feedback controller), for example a position or velocity error. The feedback signal may also be a signal representative of the velocity of the movable part. Any signal containing the periodic disturbance as a result of a control signal applied to the controlled system may be used, although a certain amount of signal conditioning may be necessary. For example, if intra-period motor position is used as an input, the harmonics due to the sawtooth, profile of e.g. rotor angle at constant velocity would have to be dealt with. As another example, if a motor position signal counting motor position over a plurality of turns would be used, the harmonics due to the continuous ramp in this position measure for constant velocity operation would have to be dealt with.

The harmonic controller may be configured to reduce the magnitude of one or more generated harmonic components to zero in response to detecting that the respective estimated phase shift exceeds a threshold value. This may be achieved by, for example, ramping down the integrator, or otherwise. In this way, high phase shifts components, which are most error prone and liable to result in positive feedback, can be suppressed to increase system stability.

The system may comprise a memory and a harmonic controller may be configured to store in the memory the accumulated value of each control loop on power down of the system. On start-up of the system subsequent to the power down, the accumulated value of each control loop can be initialised with the stored value, so that previous convergence is not lost.

It will be understood that terms like "magnitude calculator", "integrator", "harmonic generator", "multiplier", "harmonic controller", etc may equally signify physical components as well as logical organisational units of calculations, without implying that the corresponding functions are necessarily carried out in separate logics blocks. For example, the harmonic controller described above may be implemented as a single function in software or hardware, or as several inter-related functional blocks, which do not necessarily need to map on the logical functions described above and which may or may not be integrated with other aspects of the system. Without departing from the present disclosure, the functionalities of the various logical blocks described may be distributed or combined as appropriate.

In a further embodiment, there is provided a method of reducing periodic disturbances in a feedback quantity of a controlled system. The method comprises receiving a feedback signal representative of the feedback quantity and repeatedly deriving respective magnitudes of harmonic components of the feedback signal to produce corresponding error signals. The method further comprises using the error signals and harmonic components to generate a harmonic control signal and to control the controlled system with the harmonic control signal to create a plurality of negative feedback loops acting to reduce the error signal.

Using the error signals and harmonic components to generate a harmonic control signal may include processing the error signals, multiplying the components with the respective results of the processing and summing the resulting harmonic signals to generate the harmonic control signal. The processing may include integrating the produced error signals. The processing may alternatively or additionally include other calculations to replace or augment the integral control of the periodic disturbances with proportional, differential or other control modes.

DRAWINGS

A specific embodiment is now described by way of example to illustrate the concepts and principles discussed above, with reference to the accompanying drawings, in which.

DETAILED DESCRIPTION

Figure 1:
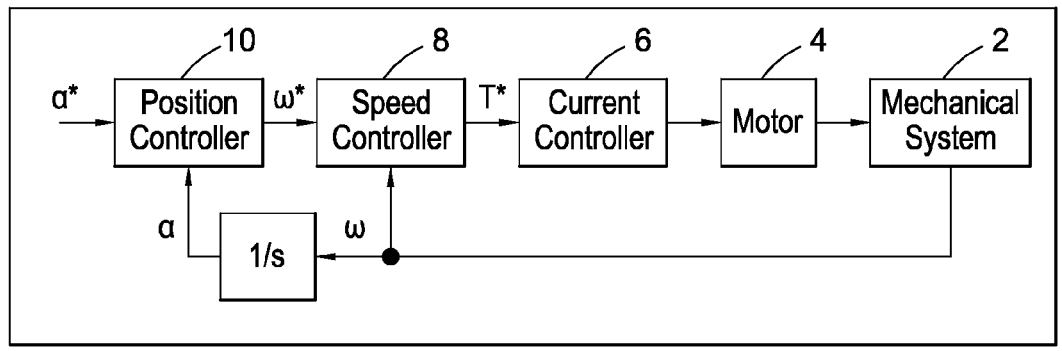
FIG. 1 depicts a position controller, with an inner speed loop, for a motor coupled to a mechanical system.

With reference to FIG. 1, a mechanical system 2 is actuated by a motor 4 under control of a current controller 6. The current controller 6 takes as its input a desired torque. The desired torque signal is produced by a speed controller 8, which receives feedback from the mechanical system of its angular velocity and an input of a desired speed signal from a position controller 10. The position controller 10 produces the desired speed signal in response to a desired position input signal and feedback of the actual position, for example from integration of the angular velocity. Variants of the controlled system in FIG. 1 include other components such as position or speed feed forward signals to increase the responsiveness of the system and the present disclosure is equally applicable to such systems.

Figure 2:
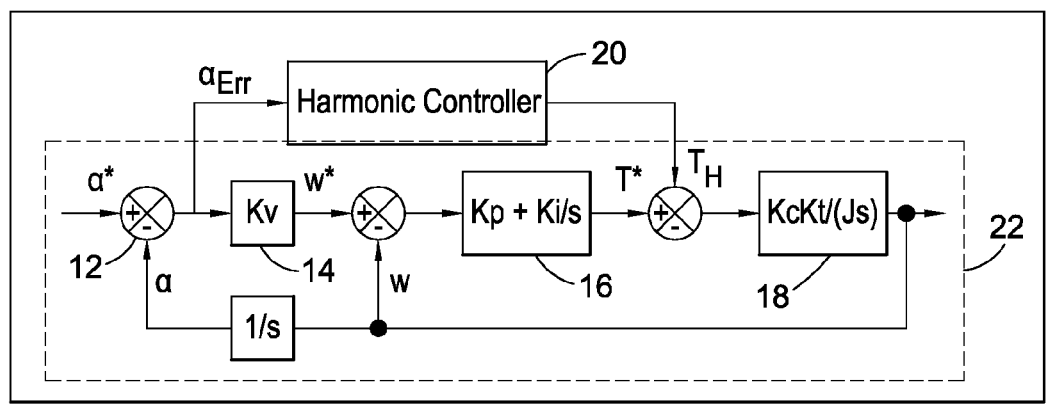
FIG. 2 illustrates a system as in FIG. 1, augmented with a harmonic controller.

With reference to FIG. 2, a block diagram of the system of FIG. 1 is now described The position controller 10 is represented by a comparator 12 and gain block 14 with gain $K_v$, the speed controller 8 is represented by a comparator and a proportional and integral gain block 16 with proportional gain $K_p$, an integral gain $K_i$ and the torque controller, motor and mechanical system are represented as a lumped model 18 with a torque demand to current gain $K_c$, a current to torque gain $K_t$ and an inertia J of the mechanical system. Additionally, a harmonic controller is connected to the system.

The harmonic controller 20 takes the position error from the output of the comparator 12 as an input, and outputs a torque demand $T_h$, which is summed with the output torque demand from the speed controller 8 (gain block 16) to provide an input to the current controller 6 (lumped model 18) to suppress periodic perturbations arising from the motor 4 and/or mechanical system 2. Such periodic perturbations may arise for example from cogging torques in the motor 4 or torques experienced by the driven mechanical system 2. From the point of view of the harmonic controller 20, the system of FIG. 1 (control blocks 12, 14, 16 and model 18 in FIG. 2) corresponds to a controlled system 22 which provides a feedback signal (the position error) containing the periodic perturbation to the harmonic controller and which receives a torque demand or input from the harmonic controller 20 causing the periodic perturbation to be compensated in closed loop operation.

Figure 3:
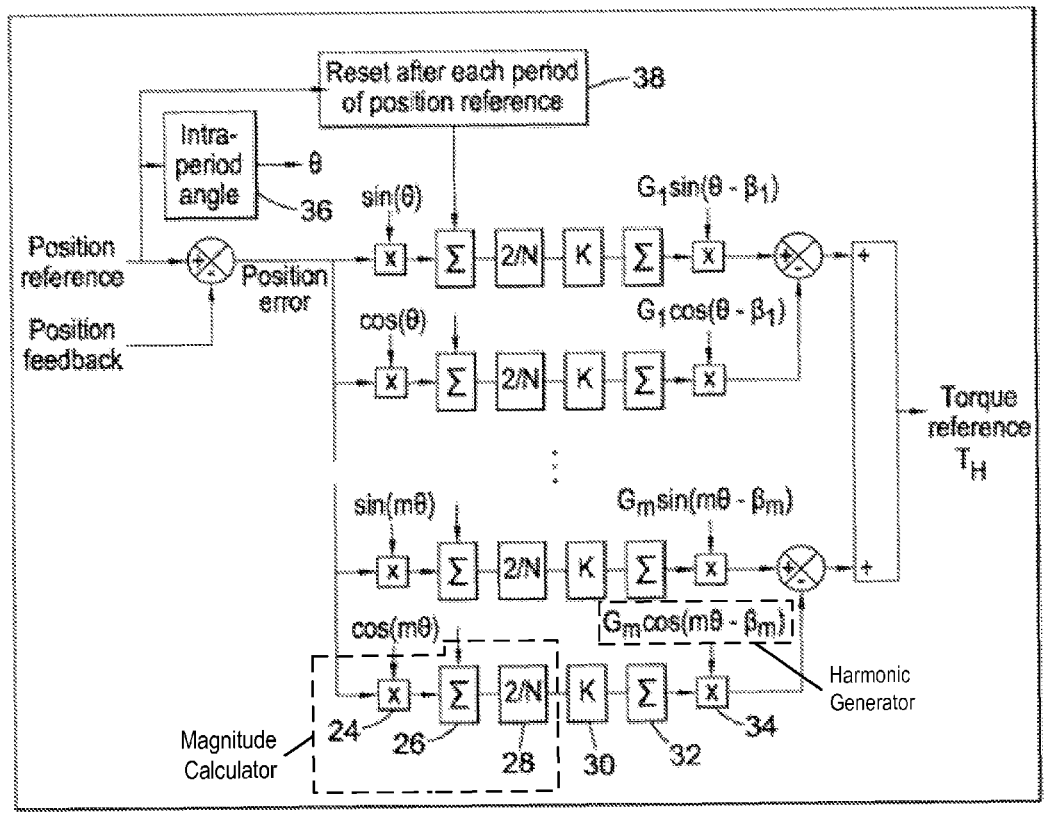
FIG. 3 illustrates details of the harmonic controller of FIG. 2.

With reference to FIG. 3, details of the harmonic controller 20 are now described. The harmonic controller 20, together with the control system 22, provides a plurality of control loops each comprising a multiplier 24 receiving the position error signal from the controlled system 22 as a feedback signal. The multiplier 24 is connected to a resettable integrator 26, which in turn is connected in series to two gain blocks 28 and 30 and a further integrator 32. The further integrator 32 in turn is connected to a further multiplier 34. As shown in FIG. 3, the multiplier 24, the resettable integrator 26, and the gain block 28 of each control loop may be components of a magnitude calculator that receives a feedback signal (e.g., the position error).

An intra-period angle calculation block 36 receives the position reference or desired position from the controlled system 22 and converts it into an intra-period angle $\theta$. For example, where the motor includes a rotating machine and the position reference indicates a position over multiple rotations of the rotor of the rotating machine, the intra-period angle $\theta$ will be the position reference modulo $2\eta$ (or, in the implementation, modulo the number of increments of digitised position making up a full rotation of the rotor). The position reference (or intra-period angle) is also fed to a reset block 38, which provides an interrupt to the integrators 26 after each period of position reference, that is after each full rotation of the rotor or each reset to zero of the intra-period angle $\theta$. The multiplier 24 multiples the position error with a harmonic function, sine or cosine of the intra-period angle $\theta$.

From top to bottom in FIG. 3, the first control loop multiples the position with sine $(\theta)$, the second loop multiplies the position error with cosine $(\theta)$, the third loop multiplies the position error with sine $(2\theta)$, the fourth loop with cosine $(2\theta)$, and so on. The penultimate loop multiplies the position error with sine $(m\theta)$ and the last loop multiplies the position error with cosine $(m\theta)$ to analyse the position error for its periodic content up to the $m^{th}$ harmonic (noting that there is no DC term and that the order in which the loops are arranged is of course arbitrary). The output of the multiplier 24 is integrated over a period of intra-period angle $\theta$ by the integrator 26. Over the period of $\theta$ the integrator 26 merely integrates its input and does not produce an output until it receives an interrupt at the end of each period from the reset block 38. In response to the interrupt, the integrator 26 outputs its value and resets to 0. A gain block 28 receives the output of the integrator 26 and scales it by 2/N, N being the number of samples integrated by integrator 26. The output of gain block 28 corresponds to the magnitude of the respective harmonic components in the position error signal for each loop.

The output of the gain block 28 is multiplied by an adjustable gain K at gain block 30 and then summed by the integrator 32 to produce an accumulated magnitude at its output. The accumulated magnitude from the integrator 32 is input to a further multiplier 34 which multiples the accumulated magnitude with a harmonic function (e.g., generated by a harmonic generator of each control loop as shown in FIG. 3) of the same order as the harmonic function multiplied with at multiplier 24 but being scaled by a gain $G_m$ and having a phase shift $\beta_m$ relative to the initial harmonic function. The gain and phase shift are specific to the frequency of the harmonic function of the loop, that is specific to the harmonic order m. Calculation of the gain $G_m$ and phase shift $\beta_m$ is discussed below.

Since the respective harmonic components, at least in the ideal case of a linear controlled system, are independent, the harmonic controller 20 together with the controlled system 22 implements a plurality of mutually substantially independent control loops, each of which can be seen as producing an error signal in the form of the magnitude of its respective harmonic component which is accumulated to produce an output which is superimposed with the output of other loops to result in a negative feedback control signal to be supplied to the controlled system 22 (noting that the feedback loop is negative due to the inversion of the position feedback to the derive the position error).

Figure 4:
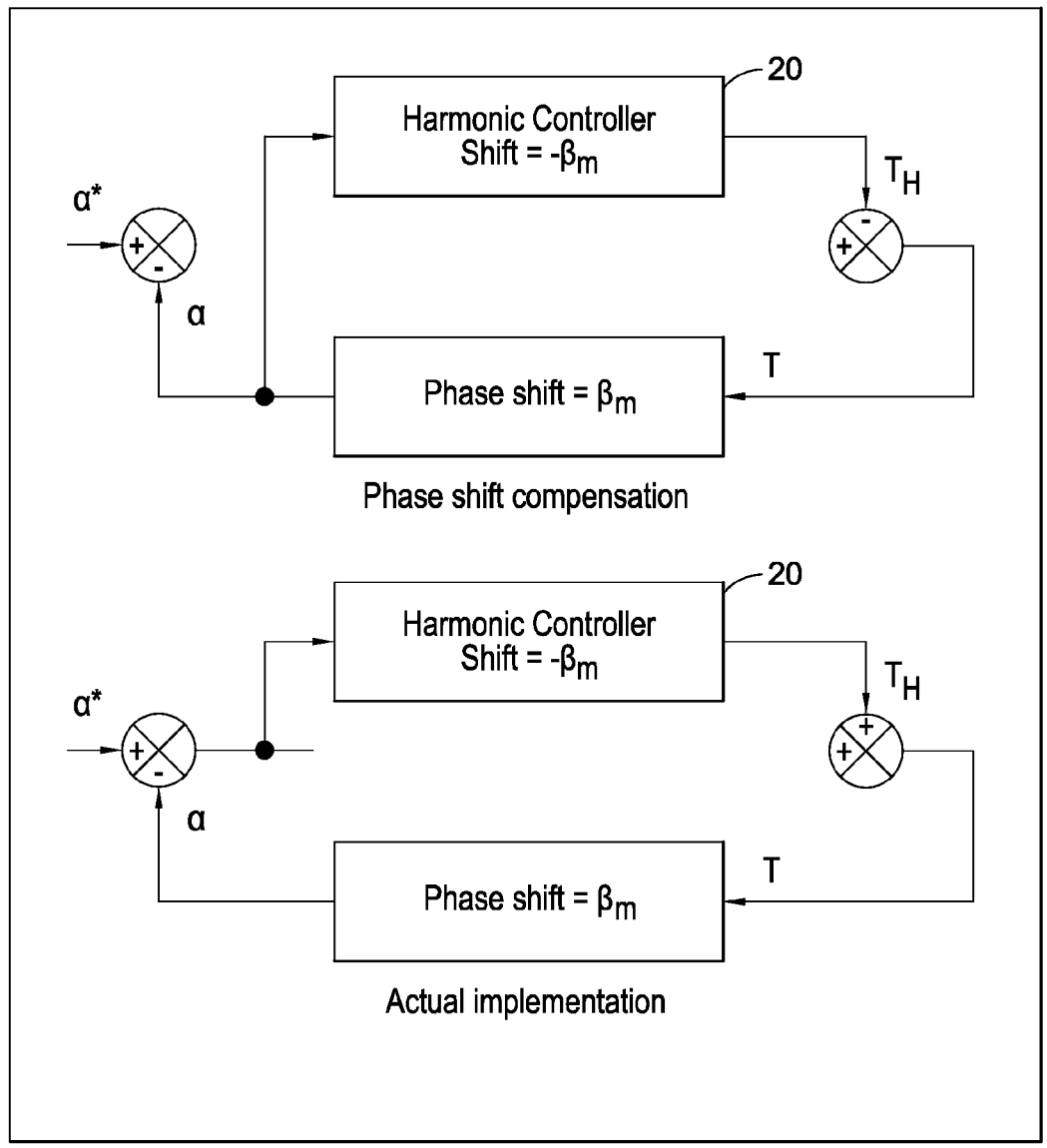
FIG. 4 illustrates considerations when selecting different input signals for the harmonic controller.

The phase shift from the torque demand output by the harmonic controller 20 to the position error input to the harmonic controller 20 in the controlled system 22 depends on the frequency of the signal. Therefore, it is necessary to compensate for this phase shift to ensure that one or more of the control loops do not accumulate a phase shift of more than 360 degrees to result in an unstable positive feedback loop. Ideally, the phase shift between $T_H$ and the feedback signal in the controlled system 22 would be fully compensated by the phase shift $\beta_m$ between the torque demand $T_H$ produced by the respective control loop relative to the harmonic function at the multiplier 24. This is illustrated in FIG. 4. FIG. 4 also illustrates that where a feedback signal other than an error signal is used as an input to the harmonic controller 20, the inversion otherwise applied at the feedback comparator must be applied somewhere else, for example at the summer combining the torque demand from the speed controller 8/16 with the harmonic torque reference $T_H$, to ensure a stable negative feedback loop is obtained. Examples of such feedback signals are motor position $\alpha$, intra-period position or angle $\theta$, or speed.

As explained above, each component must be phase shifted before recreating the torque in the time domain so that the frequency component has the correct phase when the effect of the injected torque appears in the position error. If this is not the case then the feedback control loop for the particular component can include positive feedback. As shown below the phase shift from injecting the torque to the position feedback is the phase shift of the torque disturbance characteristic of the controlled system 22 ($\alpha(s)/T_H(s)$).

The position to torque disturbance characteristic is given by $$\frac{\alpha(s)}{T_H(s)} = \frac{1}{K_c K_t K_l K_v} \times \frac{s}{\frac{s^3 J}{K_c K_t K_i K_v} + s^2\left(\frac{K_p}{K_i K_v}\right) + s\left(\frac{K_p}{K_i} + \frac{1}{K_v}\right) + 1}$$

The phase shift associated with this characteristic in the steady state is given by $$\beta_m = \frac{\pi}{2} - \tan^{-1}\left(\frac{\omega_m(K_p K_v + K_i) - \frac{\omega_m^3 J}{K_c K_t}}{K_i K_v - \omega_m^2 K_p}\right)$$

Where $\omega_m$ is the angular frequency of each component for in rad/second a speed demand SpeedRef in revolutions per minute and is given by $$\omega_m = 2\pi m \times \frac{SpeedRefRpm}{60}$$

This phase shift does not include system timing delays or any additional delays that may be introduced by filters added into the controlled system. These can be included with a simple delay.

$$\theta_{Delay} = T_{Delay} \times \frac{\omega_m}{2\pi}$$

Therefore $$\beta_m = \frac{\pi}{2} - \tan^{-1}\left(\frac{\omega_m(K_p K_v + K_i) - \frac{\omega_m^3 J}{K_c K_t}}{K_i K_v - \omega_m^2 K_p}\right) + \theta_{Delay}$$

Further, as explained above, a gain $G_m$ is applied to each component when the torque is generated in the time domain. If the gain values follow the inverse characteristic of the gain of the controlled system 22, i.e. $1/(\alpha(j\omega)/T_H(j\omega))$, then the loop gain for each component will be the same. Also the magnitude of each component will automatically change as the reference speed and hence the absolute frequency of each component changes.

The gain of the characteristic is given by $$\left|\frac{\alpha(j\omega_m)}{T_H(j\omega_m)}\right| = \frac{\frac{\omega}{K_c K_t}}{\sqrt{(K_t K_v - \omega_m^2 K_p)^2 + \left(\omega_m(K_p K_v + K_i) - \frac{\omega_m^3 J}{K_c K_t}\right)^2}}$$

The absolute gain is not required, but the relative gain for each component as the gain simply affects the overall loop gain for each component. Therefore $G_m$ used with each component is relative to the gain for 1 rad/s. The gain required is the inverse of the gain of the characteristic and therefore $$G_m = \frac{\left|\frac{\alpha(j)}{T_H(j)}\right|}{\left|\frac{\alpha(j\omega_m)}{T_H(j\omega_m)}\right|}$$

The harmonic controller 20 may be provided with additional functionality, for example to avoid using harmonic components if the associated phase shift indicates that it is prone to error and risks resulting in positive feedback. Errors in the phase shift become more significant as the frequency of the component increases because the phase shift is affected more by the delay element. Compensating for higher frequency components is not as important because the inertia of the system filters the torque disturbance effect. Therefore if the calculated phase shift is larger than a specified level the respective integrator 32 in the relevant loop can be ramped down to zero if required.

Further, depending on the time constant associated with the gain block 30, the value of the integrator 32 will settle over a number of iterations until the periodic perturbations are compensated for. To facilitate compensation from start up, the value of the integrator 32 can be stored in a memory on power down and this stored value can then be loaded in the integrator 32 when the system is next started up to avoid having to re-converge the harmonic controller 20.

Figure 5:
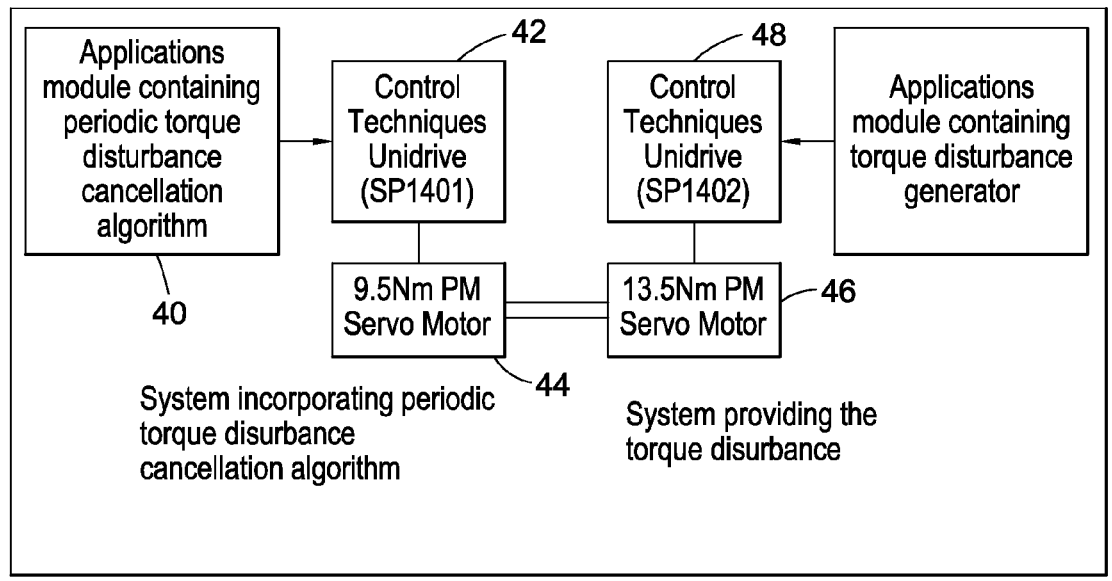
FIG. 5 illustrates a test rig for illustrating the operation of the harmonic controller.
Figure 6A:
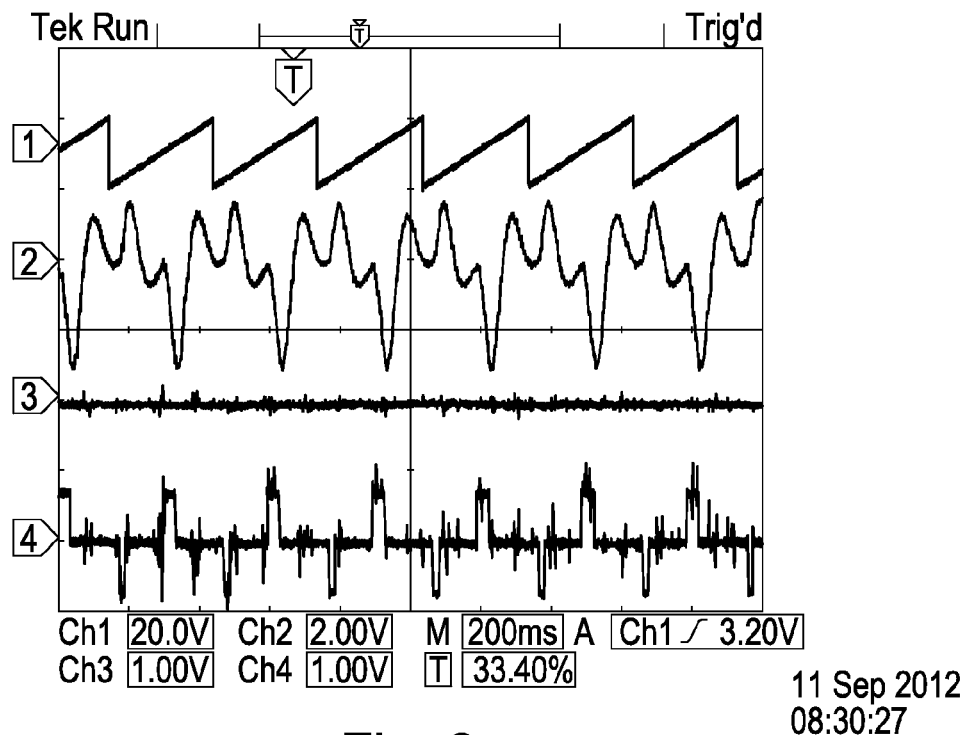
FIGS. 6a and 6b illustrate results obtained with the test rig of FIG. 5.
Figure 6B:
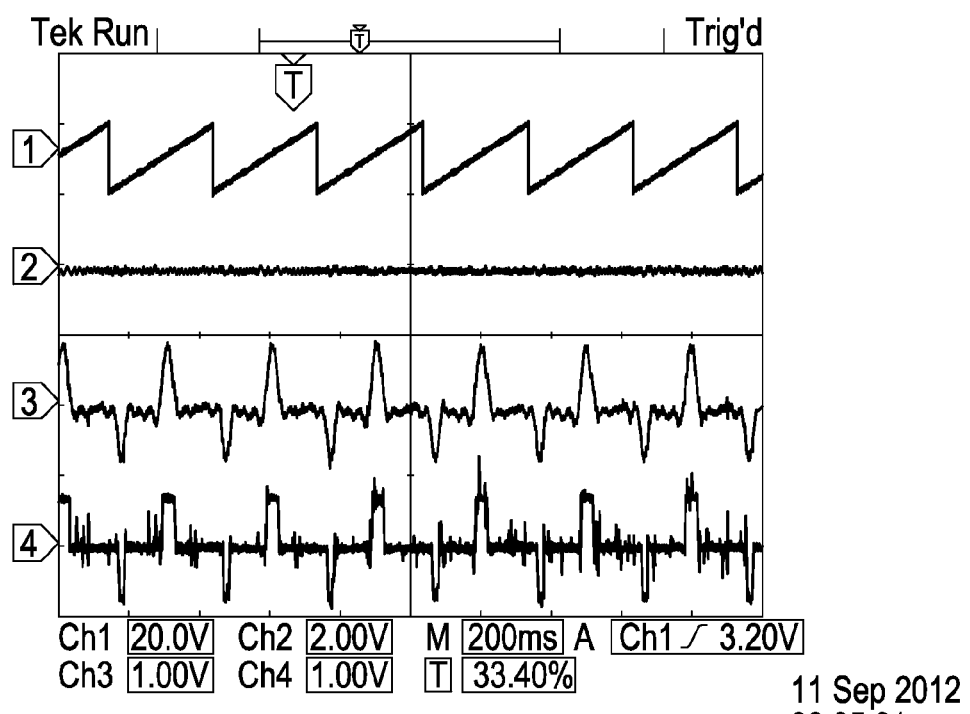

A test rig used to demonstrate the effectiveness of the harmonic controller is now described with FIG. 5. The harmonic controller 20 is implemented in a software function 40 provided as an application module to a drive 42 controlling a permanent magnet servo motor to follow a constant position ramp (constant speed). Another permanent magnet servo motor 46 is connected to the shaft of the motor 44 and is controlled by a drive 48 loaded with an application module having a software function which causes the motor 46 to produce periodic torque disturbance on the shaft of the motor 44. The results are presented in FIG. 6a (the motors running at 200 rpm with the harmonic controller 20 disabled) and 6b (the motor is running at 200 rpm with the harmonic controller 20 enabled). The channels are assigned as follows:

Channel 1: Position reference (intra-period)
Channel 2: Position error (amplified)
Channel 3: Output of harmonic controller 20
Channel 4: Torque disturbance produced by motor 46

It can be seen that switching on the harmonic controller 20 eliminates the position error and causes the output of the harmonic controller 20 to mirror the torque disturbance. It is interesting to note that, due to the limited harmonic content of the torque signal from the harmonic controller 22 (m=10), the difference in the width of the positive and negative torque disturbance pulses is translated to a difference in magnitude, rather than widths of the torque signal from the harmonic controller 20, which has the same effect as a change in pulse widths due to the integration of the torque input by the inertia of the motors.

It will be understood that the above description of a specific embodiment has been made by way of example only and that the present disclosure is more widely applicable, as explained above. In particular, the controllers described above may be implemented in dedicated hardware, software or a combination of these two, with the boundaries between the logical components referred to above being drawn for convenience of exposition rather than to limit the actual implementation. As to the controlled system 22, it will be understood that the above description is not limited to any specific controlled system. For example, the position or speed loops could be omitted or augmented with additional feed forward control, for example, speed or torque prediction. Different models could be used for the motor and mechanical system. The motor may be a rotating or linear motor, with reference to angle, torque, etc, construed accordingly as position or force in the case of a linear motor. Further, the above description is not limited to motors driving mechanical systems but may also be applicable to any controlled system in which a feedback quantity of the controlled system is subject to periodic perturbations. The output of the harmonic controller, of course, changes as a function of the controlled system and application. For a controlled system including a motor, control quantities such as force, current or flux can be used instead of torque without departing from the above description. The output of the harmonic controller, of course, changes as a function of the controlled system and application. For a control system including a motor, control quantities such as force, current or flux can be used instead of torque without departing from the above description.

It will be understood that the above description is made by way of example to illustrate the concepts and principles underlying the present disclosure and not to limit the scope of the claimed invention, as set out in the appendent claims.

The invention claimed is:

1. A system comprising a controlled system and a harmonic controller connected to the controlled system to provide a harmonic control signal to the controlled system for reducing periodic disturbances in a feedback quantity of the controlled system, the system having a plurality of control loops, the harmonic controller comprising for each control loop:
   a magnitude calculator coupled to the controlled system to receive a feedback signal representative of the feedback quantity and configured to repeatedly calculate a value of a magnitude of a respective harmonic component of the feedback signal;
   an integrator coupled to the magnitude calculator to receive the repeatedly calculated values, the integrator being configured to sum the received values to produce an accumulated value;
   a harmonic generator configured to generate a harmonic signal having a frequency equal to a frequency of the respective harmonic component and a phase relative to the respective harmonic component set to compensate for an estimated phase shift produced by the controlled system between the harmonic control signal and the feedback signal at the frequency of the respective harmonic component;
   a multiplier coupled to the integrator and harmonic generator to multiply the accumulated value and the harmonic signal to produce a generated harmonic component;
   wherein the harmonic controller is arranged to sum the generated harmonic components to produce the harmonic control signal and to apply the harmonic control signal to the controlled system to reduce the periodic disturbance in the feedback quantity.

2. A system as claimed in claim 1, the controller being configured to scale the generated harmonic component in each control loop to render the gain of the control loops independent of the frequency of the generated harmonic component.

3. A system as claimed in claim 1, the magnitude calculator being configured to multiply the respective harmonic component with the feedback signal and to integrate the result over one or more periods of the respective harmonic component.

4. A system as claimed in claim 1, the respective harmonic components comprising two harmonic components in quadrature at a fundamental frequency and one or more pairs of further harmonic components in quadrature at integer multiples of the fundamental frequency, preferably wherein the integer multiples are contiguous.

5. A system as claimed in claim 1, the controlled system comprising a motor for moving a moveable part relative to a stationary part.

6. A system as claimed in claim 5, wherein the harmonic components are a function of a position of the moveable part relative to the stationary part.

7. A system as claimed in claim 6, wherein the moveable part is a rotor rotatable relative to the stationary part and the position is an angular position of the rotor relative to the stationary part.

8. A system as claimed in claim 5, wherein the harmonic control signal is representative of motor torque, force, current or flux.

9. A system as claimed in claim 8, in which the controlled system comprises a feedback controller, the feedback controller being configured to produce a feedback error control signal in response to an error signal based on a comparison between a desired and an actual position or velocity of the moveable part, wherein the controlled system is configured to combine the feedback error control signal and the harmonic control signal to control the motor.

10. A system as claimed in claim 9, in which the feedback signal is the error signal or a signal representative of the velocity of the moveable part.

11. A system as claimed in claim 1, the harmonic controller being configured to reduce the magnitude of one or more generated harmonic components to zero in response to detecting that the respective estimated phase shift exceeds a threshold value.

12. A system as claimed in claim 1, the system comprising a memory and the harmonic controller being configured to store the accumulated value each control loop on power down of the system in the memory and to initialise the accumulated value of each control loop with the respective stored accumulated value on subsequent power up of the system.

13. A method of reducing periodic disturbances in a feedback quantity of a controlled system using a harmonic control signal, the method comprising:
   receiving a feedback signal representative of the feedback quantity;
   repeatedly deriving respective magnitudes of harmonic components of the feedback signal to produce error signals;
   estimating respective phase shifts produced by the controlled system between the harmonic control signal and the feedback signal for each harmonic component;
   using the error signals, phase shifts and harmonic components to generate a harmonic control signal;
   controlling the controlled system with the harmonic control signal to create a plurality of negative feedback loops acting to reduce the error signals.

14. A method as claimed in claim 13, wherein using the error signals, phase shifts and harmonic components to generate a harmonic control signal includes processing the error signals, multiplying the harmonic components with the respective results of the processing, shifting the phase of each harmonic component to compensate for the respective phase shift and summing the resulting harmonic signals to generate the harmonic control signal.

15. A method as claimed in claim 14, wherein the processing includes integrating the produced error signals.

16. A method as claimed in claim 13, wherein using the error signals, phase shifts and harmonic components to generate a harmonic control signal includes scaling the harmonic components to render the closed loop gain of the harmonic control signal independent of frequency.

17. A method as claimed in claim 13, the controlled system comprising a motor for moving a moveable part relative to a stationary part, wherein the harmonic components are a function of a position of the moveable part relative to the stationary part.

18. A method as claimed in claim 17, wherein the moveable part is a rotor rotatable relative to the stationary part and the position is an angular position of the rotor relative to the stationary part.

19. A method as claimed in claim 17, wherein the harmonic control signal is representative of motor torque, force, current or flux and the controlled system comprises a feedback controller, the feedback controller being configured to produce a feedback error control signal in response to an error signal based on a comparison between a desired and an actual position or velocity of the moveable part, wherein the controlled system is configured to combine the feedback error control signal and the harmonic control signal to control the motor.

20. A method as claimed in claim 19, in which the feedback signal is the error signal or a signal representative of the velocity of the moveable part.

* * * * *

UNITED STATES PATENT AND TRADEMARK OFFICE
CERTIFICATE OF CORRECTION

PATENT NO.        : 9,223,321 B2
APPLICATION NO.   : 14/080298
DATED             : December 29, 2015
INVENTOR(S)       : Michael Cade It is certified that error appears in the above-identified patent and that said Letters Patent is hereby corrected as shown below:

In the Drawings

In sheet 4 of 5, figure 5, please replace two instances of "disurbance" with "disturbance."

In the Specification

In column 5, line 42, please replace "control" with "controlled."
In column 5, line 59, please replace "2η" with "2π."
In column 6, line 64, please replace "8/16" with "8."
In column 7, lines 14-16, please replace "$$\frac{\alpha(s)}{T_H(s)} = \frac{1}{K_c K_t K_l K_v} \times \frac{s}{\frac{s^3 J}{K_c K_t K_i K_v} + s^2\left(\frac{K_p}{K_i K_v}\right) + s\left(\frac{K_p}{K_i} + \frac{1}{K_v}\right) + 1}$$"

with

"$$\frac{\alpha(s)}{T_H(s)} = \frac{1}{K_c K_t K_i K_v} \times \frac{s}{\frac{s^3 J}{K_c K_t K_i K_v} + s^2\left(\frac{K_p}{K_i K_v}\right) + s\left(\frac{K_p}{K_i} + \frac{1}{K_v}\right) + 1}$$"

In column 8, line 54, please replace "22" with "20."
In column 9, lines 19-23, please replace "description. The output of the harmonic controller, of course, changes as a function of the controlled system and application. For a control system including a motor, control quantities such as force, current or flux can be used instead of torque without departing from the above description" with "description."

Signed and Sealed this
Twenty-sixth Day of July, 2016

Michelle K. Lee
*Director of the United States Patent and Trademark Office*